(12) United States Patent
Loeffler et al.

(10) Patent No.: US 9,908,179 B2
(45) Date of Patent: Mar. 6, 2018

(54) BALANCING DEVICE FOR A BAR LOADING MAGAZINE

(71) Applicant: FMB Maschinenbau- gesellschaft mbH & Co. KG, Faulbach (DE)

(72) Inventors: Kai Loeffler, Erlenbach am Main (DE); Helmut Wichtlhuber, Miltenberg (DE)

(73) Assignee: FMB Maschinenbau-gesellschaft mbH & Co. KG, Faulbach (DE)

( * ) Notice: Subject to any disclaimer, the term of this patent is extended or adjusted under 35 U.S.C. 154(b) by 420 days.

(21) Appl. No.: 14/566,365

(22) Filed: Dec. 10, 2014

(65) Prior Publication Data
US 2015/0165526 A1    Jun. 18, 2015

(30) Foreign Application Priority Data

Dec. 13, 2013    (DE) .......................... 10 2013 020 597

(51) Int. Cl.
*B23B 13/08*    (2006.01)
*B23B 13/10*    (2006.01)
*B23B 13/12*    (2006.01)

(52) U.S. Cl.
CPC .............. *B23B 13/08* (2013.01); *B23B 13/10* (2013.01); *B23B 13/12* (2013.01); *B23B 2250/04* (2013.01); *Y10T 82/2518* (2015.01)

(58) Field of Classification Search
CPC ..... B23B 2250/04; B23B 13/08; B23B 13/10; B23B 13/12
See application file for complete search history.

(56) References Cited

U.S. PATENT DOCUMENTS 1,634,396 A * 7/1927 Cole ....................... B23B 31/00
                                                    82/165
4,058,036 A * 11/1977 Austin ................... B23B 13/123
                                                    82/163
(Continued)

FOREIGN PATENT DOCUMENTS

DE           245934 A1     5/1987
DE           270136 A1     7/1989
(Continued)

OTHER PUBLICATIONS

"European Search Report", "issued in parallel European Application", dated Apr. 30, 2015, Published in: EP.
(Continued)

*Primary Examiner* — Sara Addisu
(74) *Attorney, Agent, or Firm* — Kaplan Breyer Schwarz, LLP

(57) ABSTRACT

A balancing device for a bar loading magazine for guiding material bars on a turning machine, includes at least one mass body that can be repeatedly positioned in relation to a guiding unit that allows a rotation of an introduced material bar about a rotary axis. The mass body is, after each completed positioning, in a connection with the guiding unit and/or the material bar, so that the mass body rotates, during the rotation of an introduced material bar, together with the material bar at the same angular speed about the rotary axis. At least one positioning unit is designed to bring the mass body into a starting position in relation to the guiding unit, to detect during rotation any required repositioning because of an imbalance, and to reposition in each case the mass body in response to the detection of any required repositioning in relation to the guiding unit.

8 Claims, 7 Drawing Sheets

(56) References Cited

U.S. PATENT DOCUMENTS

| | | | | | |
|---|---|---|---|---|---|
| 4,998,455 | A | * | 3/1991 | Jauch | B23B 7/06 82/118 |
| 5,115,702 | A | * | 5/1992 | Link | B23B 13/02 29/37 R |
| 5,456,146 | A | * | 10/1995 | Hubbard | B23B 13/126 279/133 |
| 5,911,804 | A | * | 6/1999 | Haller | B23B 13/04 82/1.11 |
| 6,045,308 | A | * | 4/2000 | Frank | B23B 31/006 408/239 R |
| 6,062,778 | A | * | 5/2000 | Szuba | B23B 29/02 408/13 |
| 6,471,453 | B1 | * | 10/2002 | Winebrenner | B23B 31/00 408/143 |
| 6,523,443 | B1 | * | 2/2003 | Hof | B23Q 11/0032 82/1.4 |
| 6,575,063 | B1 | * | 6/2003 | Inaba | B23B 13/027 82/126 |
| 6,619,897 | B2 | * | 9/2003 | Erickson | B23B 29/046 403/322.1 |
| 7,647,854 | B2 | * | 1/2010 | Loustanau | B23B 1/00 700/160 |
| 8,161,852 | B2 | * | 4/2012 | Casalini | B23B 13/04 82/126 |
| 2004/0003677 | A1 | * | 1/2004 | Yamamoto | B23B 31/00 74/570.2 |
| 2008/0089754 | A1 | * | 4/2008 | Fronius | B23B 29/03492 409/141 |
| 2010/0061822 | A1 | * | 3/2010 | Gerber | B23B 31/006 409/131 |
| 2012/0090436 | A1 | * | 4/2012 | Schmidt | B23B 13/10 82/126 |
| 2013/0333531 | A1 | * | 12/2013 | Koll | G05B 19/182 82/1.11 |
| 2014/0109733 | A1 | * | 4/2014 | Schmidt | B23B 13/00 82/1.11 |
| 2016/0001373 | A1 | * | 1/2016 | Tada | B23Q 11/0035 700/160 |

FOREIGN PATENT DOCUMENTS

| | | |
|---|---|---|
| DE | 102004058286 A1 | 3/2006 |
| DE | 102008027327 A1 | 12/2009 |
| DE | 102011015578 A1 | 10/2012 |
| DE | 102012216867 A1 | 4/2013 |
| FR | 2273198 A1 | 12/1975 |
| JP | 05318206 A * | 12/1993 |
| JP | 10071509 A * | 3/1998 ....... B23B 29/03492 |

OTHER PUBLICATIONS

"Parent German Patent Application No. 10 2013 020 597.2", "Office Action", dated Dec. 20, 2013, Publisher: DPM, Published in: DE.

* cited by examiner

BALANCING DEVICE FOR A BAR LOADING MAGAZINE

CROSS-REFERENCE TO RELATED APPLICATIONS

This application claims priority to German Patent Application No. 10 2013 020 597.2, filed on Dec. 13, 2013, the entire disclosure of which is incorporated herein by reference.

FIELD OF THE INVENTION

The present invention relates to a balancing device for a bar loading magazine for guiding material bars on a turning machine, a bar loading magazine with an integrated balancing device as well as a corresponding balancing method.

BACKGROUND OF THE INVENTION

Turning machines for machining bar-shaped semi-finished products, which will be referred to below as material bars, are principally known and usually comprise a stationary or traversable headstock, in which one or more spindles driven by a drive unit are supported along a z axis that extends along the introduction or conveying direction of the material bars. In the processing area of the turning machine, the material bar clamped in the spindle of the turning machine is machined using a tool. To this end, the material bar is usually introduced from the rear headstock side of the turning machine into the rotary spindle thereof, which is formed as a hollow shaft, and is clamped therein using a chuck so as to be machined.

Bar loading magazines, which are also referred to as loading magazines or as bar loaders, are also principally known and allow the guiding of material bars on these turning machines. A bar loading magazine provided on a turning machine has to guide the material bar during the entire machining process as precisely as possible, in order to avoid vibrations and oscillations on the turning machine and the bar loading magazine.

When trying to avoid vibrations and/or oscillations, it is above all the support and guidance of the material bar in the bar loading magazine that is of particular importance, and a number of different requirements with regard to dimensions and geometries of the material bars have to be taken into account. Thus, as a rule the material bars have lengths of up to 6 m and diameters between 1 mm and 100 mm. Further, the material bars may have the most varied cross-sectional profiles, wherein symmetrical and unsymmetrical cross-sectional profiles have to be distinguished.

Further, the support and guidance of the material bars in the bar loading machine has to meet the most varied requirements in order to allow an economical and productive manufacturing process to take place. In this regard, often also high rotary speeds of up to 15,000 rpm for machining the material bars to be machined in a rotary manner as well as their orientation in the rotary spindle of the turning machine have to be involved. Thus, a centric or eccentric clamping in the rotary spindle of the turning machine has to be considered for material bars that have to be machined in a rotary manner, and for this reason imbalances due to an uneven mass distribution about the rotary axis about which the material bar is rotated during the rotary machining may occur, and for this reason high requirements have to be met by the guiding mechanism of the bar loading magazine, in order to be able to maintain the required manufacturing tolerances.

From DE 10 2011 015 578 A1, for example supporting and guiding units are known which can be traversed within the bar loading magazine along the z axis and are equipped for supporting and guiding the material bars e.g. using bushes, into which the material bars can be introduced in the longitudinal direction and also along the z axis. Further, a supporting and guiding unit suitable for this purpose, i.e. for supporting a material bar received by the guiding unit in relation to its radial orientation and to guide it along its longitudinal direction, has to allow a rotation of the material bar. For the sake of simplification, such a supporting and guiding unit will be defined below as a guiding unit.

In DE 10 2011 015 578 A1, the bushes used for such a guiding unit are rotationally supported for this purpose within a bush unit, and usually also a plurality of bush units may be positioned at a distance from each other, in particular evenly spaced from each other, along the z axis, so as to be able to avoid oscillations as far as possible.

Apart from the standardised profiles such as circular, square or hexagonal profiles or tube profiles, which have a profile that is substantially symmetrical about the longitudinal orientation thereof, there are also asymmetrical profiles, such as e.g. a so-called lock profile. This type of profile is already designed to have an often even continuous asymmetry of the profile bar cross section in relation to the longitudinal direction thereof over the entire profile length in the direction of the longitudinal axis.

Thus, during the machining of rotating material bars, as a rule an undesirable imbalance develops as a result of the rotation of unequally distributed masses. This imbalance is caused in a more or less pronounced manner e.g. by uneven material inclusions, inaccurate manufacturing or clamping of the material bars or even due to intentionally unsymmetrical profiles, such as e.g. in the case of the lock profile. In particular in the case of intentionally unsymmetrical profiles, the rotary processing will as a rule not be carried out in the centroid of the profile, i.e. during the rotary machining, the rotary axis is eccentric in relation to the main axis of inertia of the material bar along the longitudinal direction thereof, and any imbalance occurring here during rotation will therefore cause vibrations. However, also in the case of inaccuracies due to manufacturing, e.g. in the case of uneven material inclusions or in the case of a less than absolute straightness of the material bar, as well as in the case of an inaccurate clamping of the material bar in relation to the main axis of inertia of the material bar along the longitudinal direction thereof, any imbalance occurring here during rotation will therefore, in particular in the case of high rotary speeds, lead to substantial vibrations.

Such imbalances are especially undesirable in particular also because finished work pieces are cut off from the material bars, because due to this cutting off, the imbalances of the material bar lengths to be guided on the turning machines are subject to continuous change. Further, with each advance movement of the material bar in the introduction or conveying direction in the bar loading magazine, a further imbalance may be added as a function of the advance movement.

For counteracting any imbalance in a rotating body made from a hard and brittle material, which is technologically difficult to machine, patent document DD 245 934 A1 describes a design with a balancing weight and an associated recess in the rotating body. The balancing weight is here placed, during standstill, along a circular groove in any desired position on the circumference of the rotating body and is subsequently clamped using a screw. Consequently, such a design is not suitable for the balancing of continuously changing imbalances as may occur whilst guiding material bars on a turning machine.

For counteracting an imbalance on a component rotating about a rotary axis, on which an imbalance may occur during manufacturing or during use, DE 10 2012 216 867 A1 describes a design, according to which the component comprises a balancing element that is artificially introduced or fixed to be stationary, which protrudes from the component in such a way that it is suitable, during continuous rotation about the rotary axis, for cutting off individual pieces and wherein the balancing element is provided in such a place that it contributes to reducing the imbalance during the removal. Such a design, too, is consequently not suitable for balancing continuously changing imbalances as may occur during the guiding of material bars on a turning machine.

DE 10 2008 027 327 describes a device for automatically balancing a rotating machine part with at least one imbalance compensation disk that has at least one annular cavity provided concentrically to the rotary axis of the machine part. In this cavity, freely movable compensation elements are provided which compensate any imbalance by adopting a counter-position and which are formed as ball rollers with two symmetrically flattened end sides. Consequently, in the case of continuously changing imbalances as may occur during the guiding of material bars on a turning machine, there is a risk of an unstable system with increasing vibrations.

DD 270 136 A1 describes an apparatus for balancing a rotating system, such as e.g. a servo track writing spindle with clamped-on magnetic storage disks prior to recording the servo track, during rotation by means of a plurality of magnetic compensation masses that can be moved in a rolling manner in a co-rotating concentric annular chamber. Here, the rolling compensation masses can, whilst the system is running up, automatically always adopt the same predefined starting position. Subsequently, a positioning unit generates a localised rotating magnetic field that brings the compensation masses, one after another, once into a pre-calculated compensation position, whereupon the magnetic field and the positioning unit are switched off. Consequently, such a design is not suitable for balancing continuously changing imbalances as may occur during the guiding of material bars on a turning machine either.

SUMMARY OF THE INVENTION

It is therefore an object of the invention to provide a method for effectively counteracting a continuously changing imbalance as may occur during the guiding of material bars, in particular also during rotation and/or advance movement, on a turning machine with associated cutting off of the bars, in order to enhance in this way in particular the degree of automation in bar loading magazines even further and in order to improve the vibration behaviour of such bar loading magazines due to imbalances during the entire manufacturing process.

This object is already achieved by means of the devices and a method having the features according to an illustrative embodiment of the present invention.

Accordingly, a balancing device is provided for a bar loading magazine for guiding material bars on a turning machine, wherein a z axis is defined by the longitudinal axis of a material bar guided in the bar loading magazine, which balancing device has at least one guiding unit designed for receiving a material bar, into which guiding unit a material bar is to be introduced along the z axis and which allows the material bar introduced and conveyed for being machined on the turning machines to rotate, and wherein the guiding unit is designed in such a way that such a rotation of the introduced material bar takes place either about a rotary axis that is either coaxial or disposed to be offset from the z axis. According to the invention, the balancing device is characterised by at least one mass body that can be repeatedly positioned in relation to the guiding unit, which mass body, after each time it has been positioned, is positively and/or non-positively connected to the guiding unit and/or the material bar in such a way that this will then rotate, during the rotation of the introduced material bar, together with the material bar at the same angular speed about the rotary axis. Further, according to the invention the balancing device is characterised by at least one positioning unit that is designed to bring the at least one mass body into a starting position in relation to the guiding unit, to detect during rotation any required repositioning because of an imbalance and to reposition the mass body in each case in response to the detection of a required repositioning in relation to the guiding unit.

In this respect, the invention further proposes a bar loading magazine having such an integrated balancing device.

The invention further proposes a method for balancing an imbalance caused by the rotation of a material bar, wherein the material bar is guided in a bar loading magazine for guiding material bars on a turning machine, wherein the method according to the invention comprises the following steps:

The material bar is introduced along a z axis that is defined by the longitudinal axis of the material bar, into at least one guiding unit designed for receiving a material bar, which allows a material bar that is introduced and conveyed for being machined on the turning machine to rotate about a rotary axis that is either coaxial with or offset from the z axis. At least one mass body is positioned in relation to the guiding unit and is, once positioning has been completed, positively and/or non-positively connected to the guiding unit and/or the material bar, so that this will then rotate, during the rotation of the introduced material bar, together with the material bar at the same angular speed about the rotary axis, and in response to the detection, during the rotation, of a required repositioning because of an imbalance, in particular if a limit value predefined in this respect is exceeded, the mass body is in each case repositioned.

Accordingly, a substantial advantage is here that with the at least one mass body that can be positioned in relation to the guiding unit and that is subsequently positively and/or non-positively connected to the guiding unit and/or the material bar, a dynamic unit for counteracting vibrations caused by an imbalance is provided, which can be integrated in the bar loading magazine in a simple manner. As a result, any occurring centrifugal forces that develop as a result of an imbalance of the rotating material bar can be effectively counteracted by way of an appropriate placement or positioning of the at least one mass body, wherein not only any imbalance that can be directly detected prior to the start of a rotation can be counteracted, in particular eliminated, but also any imbalances that change during the entire machining process can be counteracted, in particular eliminated, by an appropriate repositioning of the at least one mass body.

This can be done in particular on the basis of sensor data, expediently by means of an open- or closed-loop control.

According to expedient developments, the positive and/or non-positive connection with the guiding unit and/or the material bar can be carried out in particular mechanically, pneumatically and/or hydraulically. Further, expediently at least two, in particular at least three such positionable mass bodies are provided. The one or more mass bodies may here be positionable as a function of the specific design and/or requirement preferably in relation to the rotary axis in the circumferential direction, in the radial direction and/or in the axial direction.

Further, according to expedient developments, the guiding unit may comprise at least one bush supported so as to rotate about the rotary axis, into which the material bar is to be introduced along the z axis, or a guiding passage that is either continuous or is made up of segments, in which the material bar is allowed to rotate about the rotary axis.

Therefore, the invention can be used in an extremely versatile manner and with the most varied guiding units and is further not limited to certain loading magazines or turning machines but can be used in any type of bar loading magazine for guiding at least one material bar on turning machines or similar machine tools.

BRIEF DESCRIPTION OF THE DRAWINGS

Further features and advantages of the invention will become evident from the following description of a number of expedient embodiments with reference to the attached drawings, wherein.

DETAILED DESCRIPTION

Some expedient embodiments of the invention will be described below with reference to the attached drawings, in particular by way of a balancing device for a bar loading magazine for guiding material bars on a turning machine, wherein a z axis is defined by the longitudinal axis of a material bar guided in the bar loading magazine, wherein the balancing device has at least one guiding unit adapted for receiving a material bar, in which the material bar is to be introduced along the z axis and which allows the material bar introduced and conveyed for being machined on the turning machines to rotate, and wherein the guiding unit is designed in such a way that such a rotation of the introduced material bar is carried out about a rotary axis that is either coaxial with or offset from the z axis, wherein the balancing device comprises at least one mass body that can be repeatedly positioned in relation to the guiding unit, which mass body is, each time it has been brought into a starting positioned, positively and/or non-positively connected to the guiding unit and/or the material bar in such a way that the mass body then, during the rotation of an introduced material bar, rotates together with the material bar at the same rotary speed about the rotary axis, and comprises at least one positioning unit designed to bring the at least one mass body into a starting position in relation to the guiding unit, to detect during rotation any repositioning necessary because of an imbalance, and to reposition the mass body in each case in response to the detection of a required repositioning in relation to the at least one guiding unit.

Figure 1A:
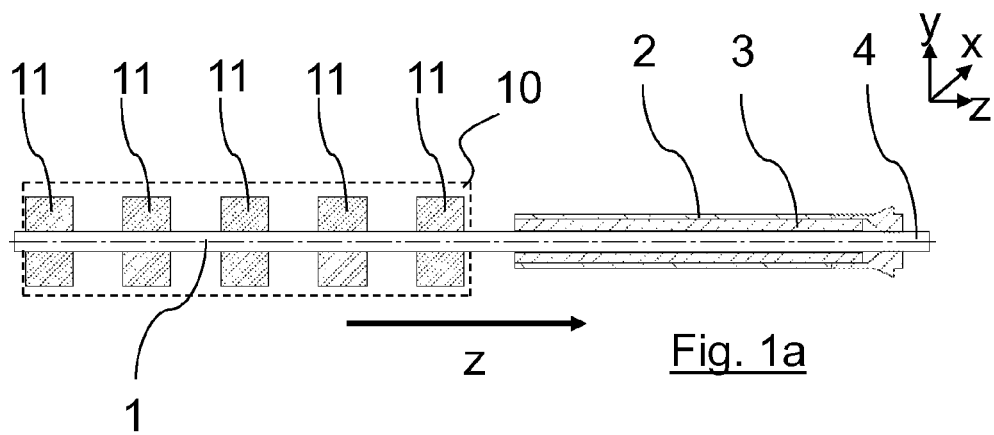
FIG. 1a shows a schematic view of a material bar supported in at least one guiding unit.

In this respect, FIG. 1a shows a schematic view of a material bar 1 that is initially introduced and supported along a z axis defined by the longitudinal axis of the material bar in the direction of the arrow according to FIG. 1a into at least one guiding unit 11 of a bar loading magazine, FIG. 1a shows five guiding units 11, and is guided, once it has passed through these guiding units 11, on the rear side into the hollow spindle 2 of a turning machine. As indicated in FIG. 1a, these guiding units 11 are part of a balancing device 10 for a bar loading magazine for guiding material bars on a turning machine, but for reasons of simplification the bar loading magazine as such and the turning machine are not shown in FIG. 1a.

An overhang 4 of the material bar 1, which protrudes into the process chamber of the turning machine, is cut off after the machining process and the material bar is pushed on along the z axis in the direction of the arrow according to FIG. 1a, and fixing is carried out in the hollow spindle 2 using clamping means 3.

Figure 1B:
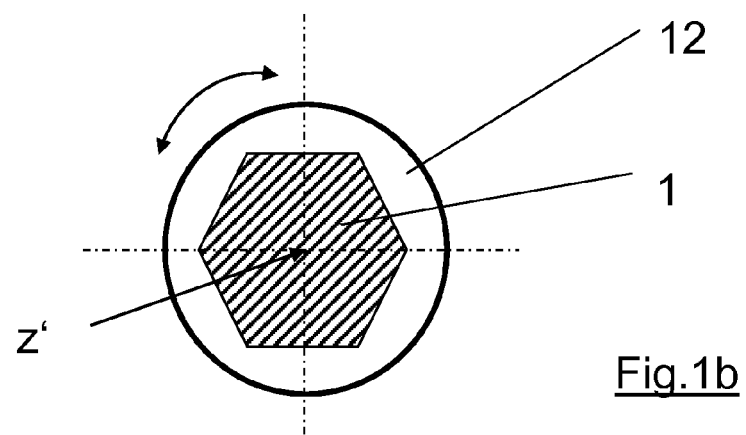
FIG. 1b shows a schematic view of a bush as part of a guiding unit according to FIG. 1a with a centrically supported material bar.

FIG. 1b shows a schematic view of a rotationally supported bush 12 that may be part of a guiding unit 11 according to FIG. 1a. In the bush 12, a profile recess is formed centrically to the rotary axis z' of the bush 12, e.g. for receiving a material bar with a hexagonal profile. Further, a material bar 1, which is indicated by shading and which is correspondingly profiled with a hexagonal profile, is centrically supported and guided in the profile recess of the bush 12. For example, in such a case the z axis or longitudinal axis of the material bar 1 and the rotary axis z' are as a rule oriented coaxially relative to each other.

Figure 1C:
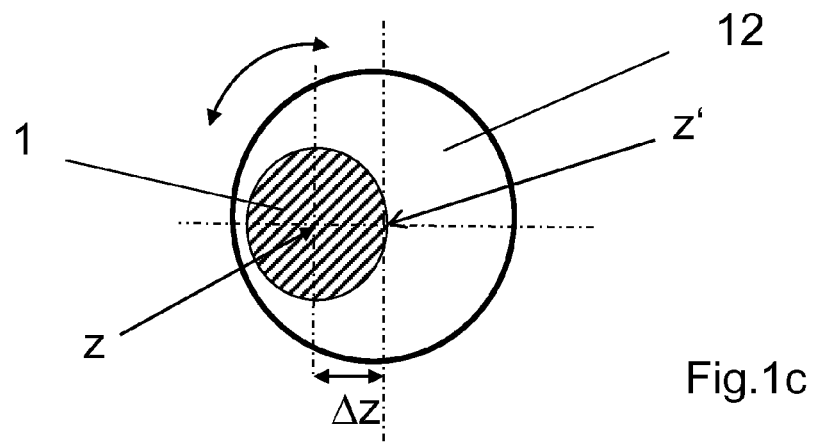
FIG. 1c shows a schematic view of a bush according to FIG. 1b with an eccentrically supported material bar.

FIG. 1c, similar to FIG. 1b, shows a schematic view of a rotationally supported bush 12 that may be part of a guiding unit 11 according to FIG. 1a. However, the bush 12 shown in FIG. 1c has a profile recess that is formed eccentrically to the rotary axis z' of the bush 1, e.g. for receiving a material bar with a circular profile. Further, a material bar 1, which is indicated by shading and which has a corresponding circular profile, is eccentrically supported and guided in the profile recess of the bush 12. For example, in such a case the z axis or longitudinal axis of the material bar 1 and the rotary axis z' are thus oriented offset from each other, in particular parallel to each other, e.g. by the offset $\Delta z$. Consequently, during rotation about the rotary axis z' of the bush 12, including the material bar 1 received therein according to FIG. 1c, an undesirable imbalance will as a rule occur due to the unevenly distributed masses of the bush 12 and the material bar 1.

In order to counteract vibrations generated by such or similar imbalances during rotation, the balancing device according to the invention comprises at least one mass body that can be repeatedly positioned in relation to the guiding unit, which mass body, each time after it has been positioned, has a positive and/or non-positive connection with the guiding unit and/or the material bar, so that this mass body then, during the rotation of the introduced material bar, rotates together with the material bar about the rotary axis at the same angular speed. In this respect, FIGS. 2a to 2d show schematic cross-sectional views of exemplary embodiments, according to which a carrier unit for receiving a bush 12 as well as at least one positionable mass body is provided. Accordingly, the carrier unit of such a bush 12 is expediently formed to be substantially cylindrical, in a practical design introduced into a ball bearing (not shown) for a rotational support about the rotary axis z', and forms a reception space 15 for the bush 12 on the inside of the carrier unit coaxially to the rotary axis z'. At a radial distance from this reception space 15, the carrier unit forms e.g. a positioning area 16, in the example shown a positioning space, for one or more mass bodies 14a, 14b, in which this or these is/are on the one hand trapped for a repeated positioning and also for a positive and/or non-positive connection with the guiding unit and/or the material bar. To this end, the carrier unit may for example be expediently formed in the manner of a sleeve that has housing shells 13a and 13b which are mounted coaxially to each other, but at a radial distance from each other, between which the positioning area 16 is formed like a chamber, and inside of the inner housing shell 13a, the reception space 15 (FIG. 2a) for the bush is located and the outer housing shell (13b) is inserted in the ball bearing (not shown).

Figure 2A:
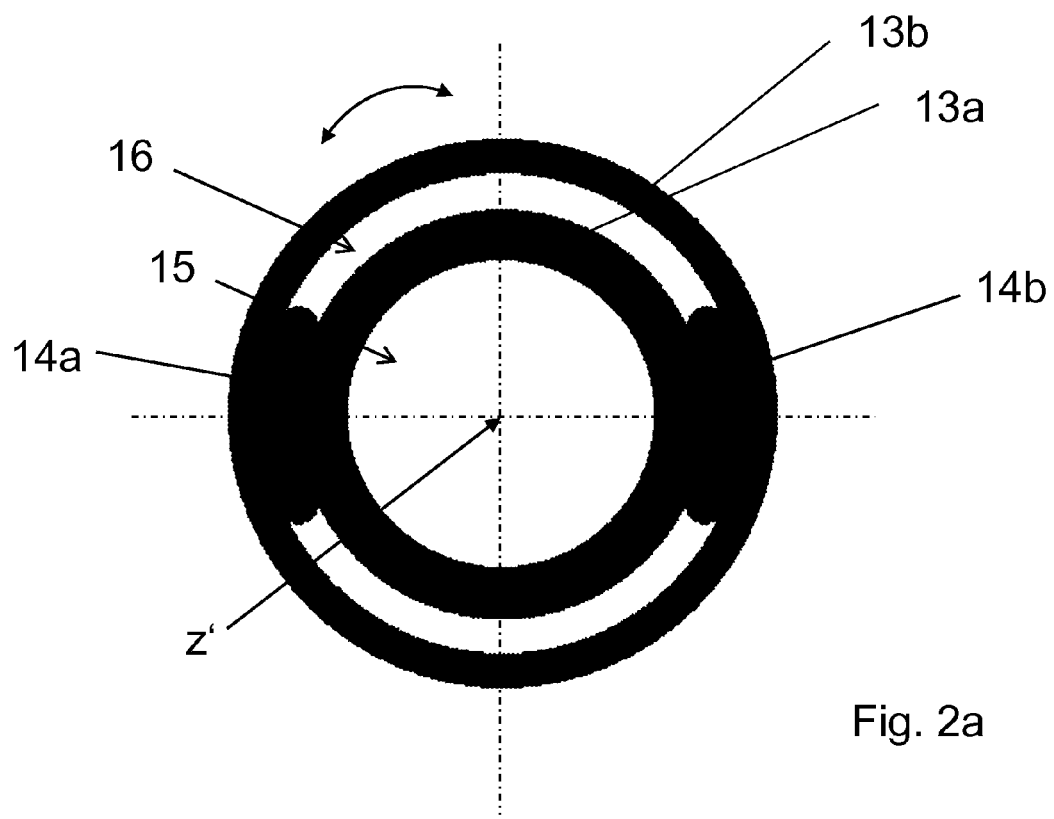
FIG. 2a shows a schematic view of a rotationally supported carrier unit that receives a bush together with two mass bodies, wherein the mass bodies are in the starting positions.

For a repeated positioning and also for a positive and/or non-positive connection with the guiding unit and/or the material bar, for example the mass body 14a according to FIG. 2a may be permanently fixedly connected to the inner housing shell 13a and the mass body 14b may be permanently fixedly connected to the outer housing shell 13b, wherein the housing shells 13a and 13b can be rotated relative to each other and can be fixed together. In addition, the inner housing shell 13a may be rotatable relative to the reception space 15 for the bush or in relation to the bush introduced into the reception space 15 and can be fixed thereto, for example by means of a frame 5 that axially clamps the carrier unit and the bush, for example as indicated in FIG. 3a which shows a section along the line A-A of FIG. 2c.

In an embodiment integrating such a carrier unit, bush and axially clamping frame of the subject matter according to the invention, in a case with two mass bodies 14a and 14b, the housing shells 13a and 13b are first of all, for an initial positioning, expediently rotated for example relative to each other as well as to the reception space 15 or a bush that has already been inserted therein, and are subsequently fixed in such a way that the mass bodies 14a and 14b are located opposite each other as can be seen in FIG. 2a. As a result of such an arrangement of the two mass bodies 14a and 14b, which is symmetrical relative to the rotary axis f, the imbalances that are initially caused by a mass body 14a or 14b during rotation cancel each other out, so that a neutral starting position is adopted.

Figure 2B:
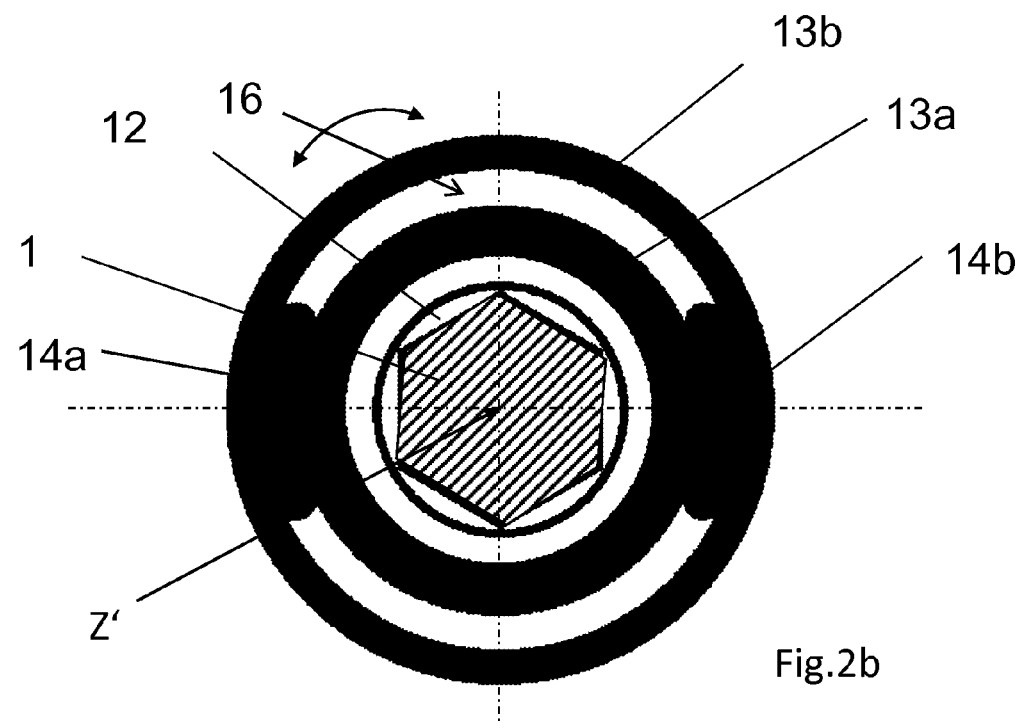
FIG. 2b shows a schematic view of the rotationally supported carrier unit according to FIG. 2a with a bush accommodated therein and a centrically introduced material bar.

FIG. 2b shows a schematic cross-sectional view of such a neutral starting position with a bush 12 inserted into the reception space 15 for the bush having a formed profile recess, in which a correspondingly profiled material bar 1 has been introduced. Since in the case of a hexagonal profiling there is as a rule no or only a minor imbalance present, the mass bodies 14a or 14b can frequently remain in the neutral starting position and only need some minor corrective repositioning.

Figure 2C:
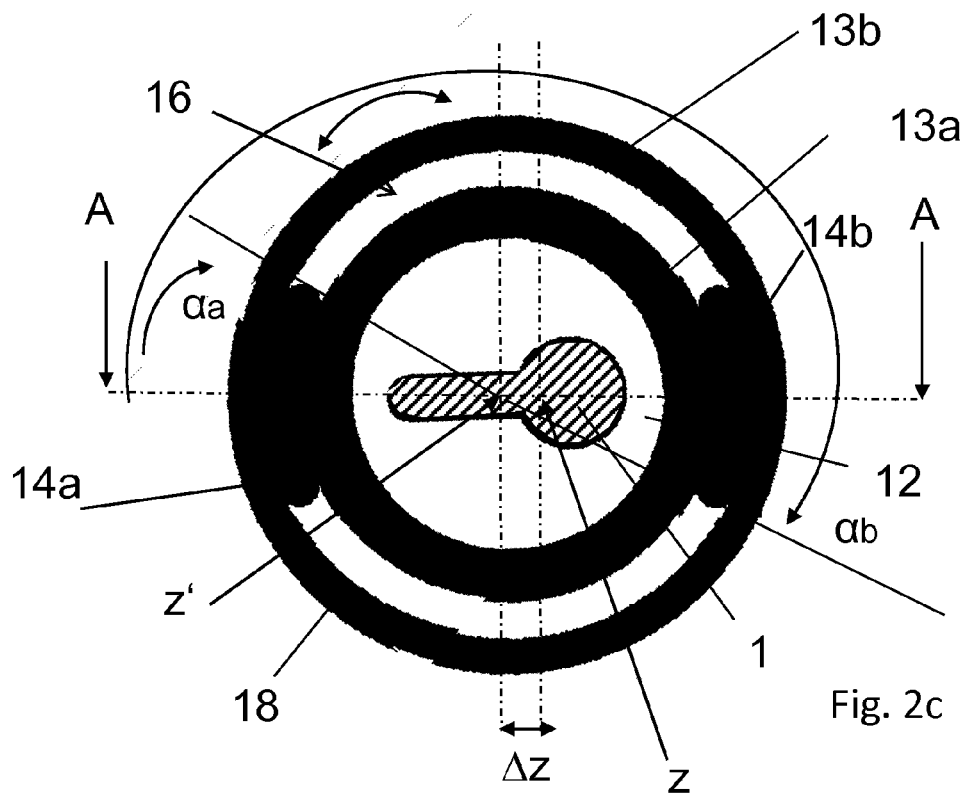
FIG. 2c shows a schematic view of the rotationally supported carrier unit according to FIG. 2a with a bush accommodated therein and an eccentrically introduced material bar.
Figure 2D:
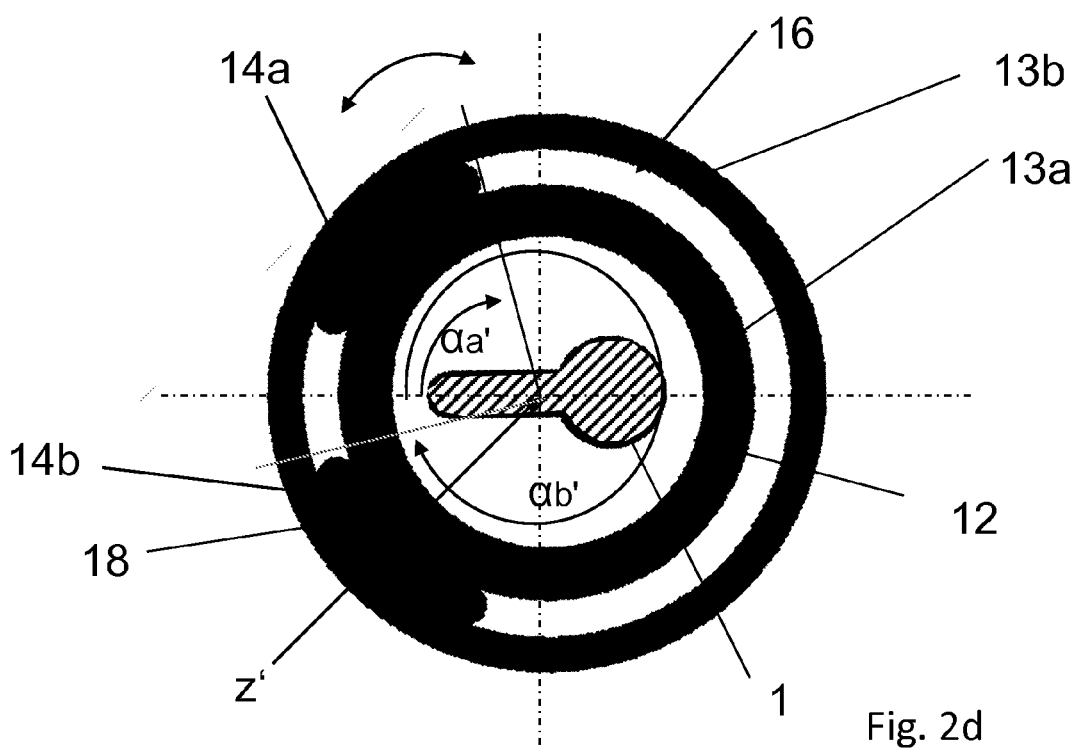
FIG. 2d shows a schematic view of a rotationally supported carrier unit according to FIG. 2c with repositioned mass bodies.
Figure 3A:
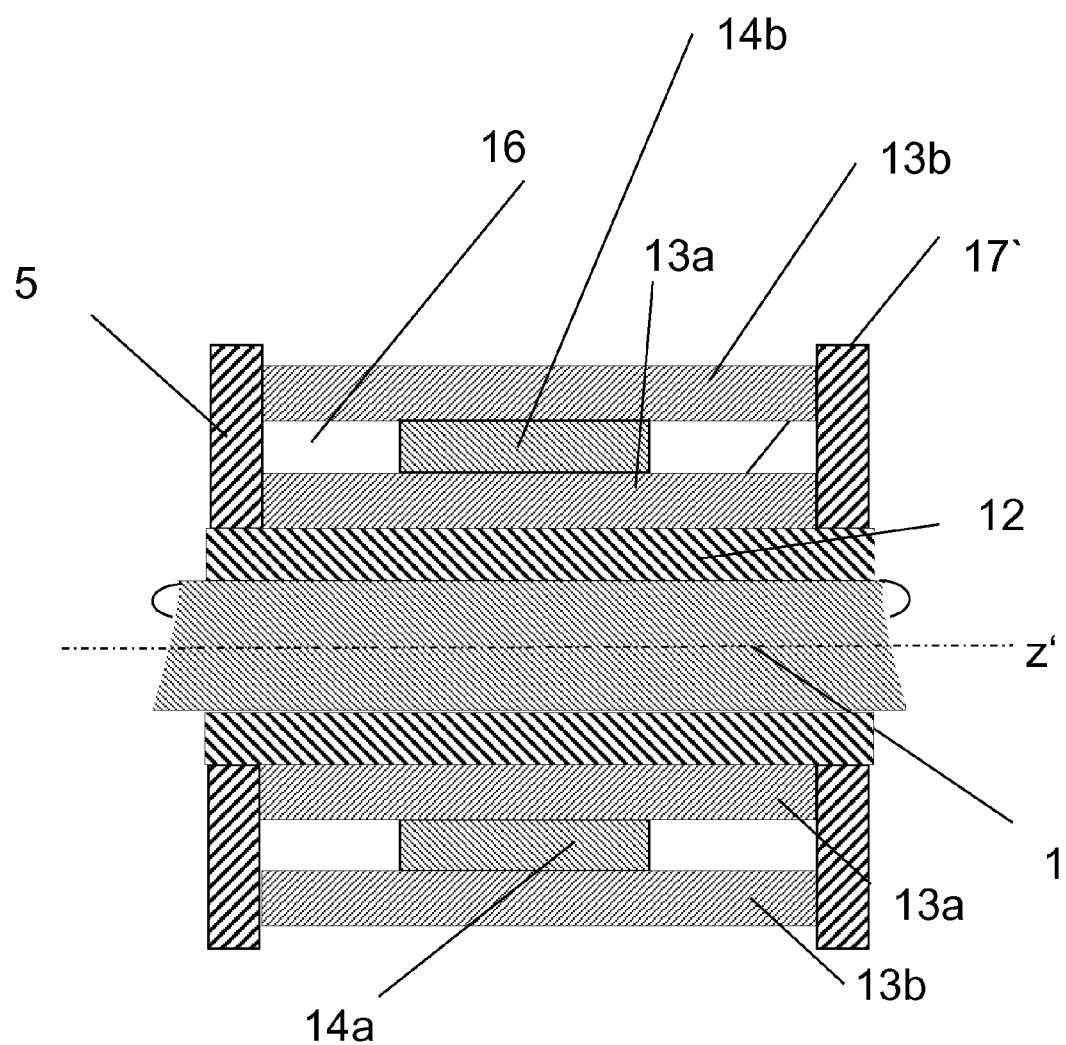
FIG. 3a shows a schematic sectional view along the section axis AA according to FIG. 2d.

FIG. 2c shows a schematic cross-sectional view similar to FIG. 2b of such a neutral starting position with a bush 12 inserted into the reception space 15 for the bush, which has a profile recess that is formed eccentrically to the rotary axis z', into which a correspondingly profiled material bar 1 has been inserted. As can be seen from FIG. 2c, due to the profile, for example the locking profile as shown, the main axis of inertia of the material bar extends through the area centroid along the longitudinal direction thereof, which means the longitudinal axis z of the profile offset from the rotary axis z', which is identified with $\Delta z$ in FIG. 2c. Since in such a case, for example similar to the case of uneven material inclusions or the case of a less than absolute straightness of the material bar, an imbalance causing vibrations is consequently present during rotation about the rotary axis z', the mass bodies 14a and 14b are not allowed to remain in a neutral starting position after an initial positioning, but need to be repositioned. In the course of this, e.g. on the basis of an angular position "αa" of the mass body 14a and an angular position "αb" of the mass body 14b in relation to the bush 12 and/or the carrier unit 13a, 13b according to FIG. 2c, the mass body 14a is repositioned to an angular position "αa'" and the mass body 14b is repositioned to an angular position "αb'" in relation to the bush 12 and/or the carrier unit 13a, 13b according to FIG. 2d, and in these angular positions any imbalance caused by the material bar 1 is effectively counteracted, in particular the imbalances respectively caused by the mass bodies 14a or 14b and the material bar 1 during rotation expediently cancel each other out.

Figure 3B:
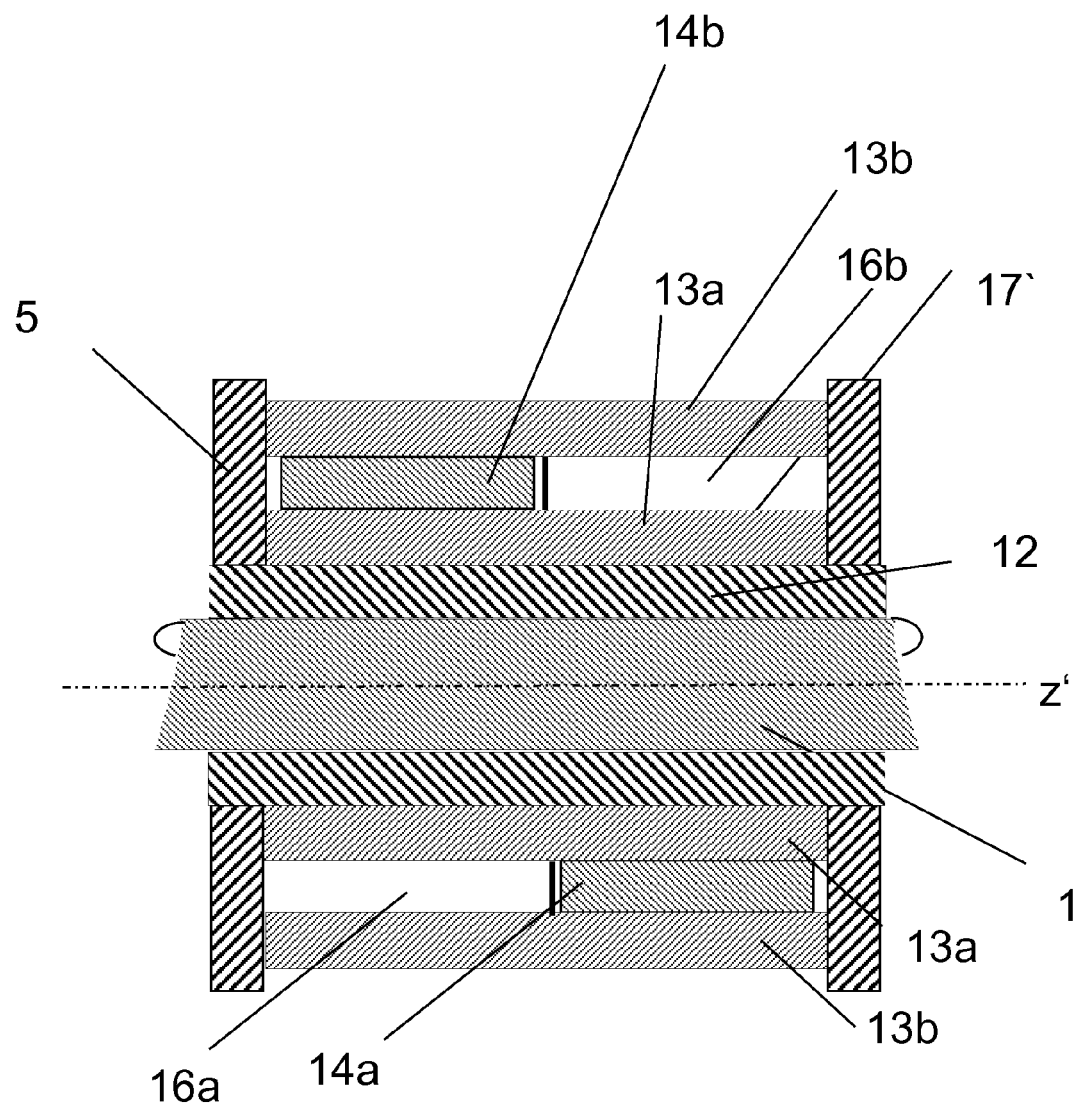
FIG. 3b shows a sectional view similar to FIG. 3a, however with positioning areas for mass bodies, which are separated along the feeding direction.

Whilst FIG. 3a shows, as described above, a section along the line A-A of FIG. 2c with a common positioning area 16 for the mass bodies 14a and 14b of a guiding unit, FIG. 3b shows a sectional view similar to FIG. 3a, however with positioning areas 16a and 16b for the mass bodies 14a and 14b, respectively, of the guide unit that are axially arranged separately from each other along the longitudinal axis. It can be seen that in the case of positioning areas that are separately arranged from each other for a plurality of mass bodies instead of a common positioning region for a plurality of mass bodies, free space for repositioning each mass body may be increased. On the other hand, a starting and/or maximum end position may be specified for each mass body independently from one or more positioning areas, e.g. by way of a corresponding arrangement of webs or other free space borders within a positioning area. Depending on the type of positioning unit, these borders may in turn completely subdivide the positioning area, so that e.g. a desired repositioning can be achieved also pneumatically by way of a corresponding different pressure build-up within a positioning area and on either side of a mass body. Also, depending on the type of positioning unit, a one-sided support for such a mass body can be provided in such a specified starting and/or maximum end position, for example by means of a spring.

Further, within the context of the invention, a positioning area for one or more mass bodies does not necessarily have to extend in the circumferential direction relative to the rotary axis z', as shown in FIGS. 2a to 2d, but may extend for example also in the radial direction relative to the rotary axis z', in the axial direction relative to the rotary axis z' or diagonal to the rotary axis z', i.e. at an angle of more or less than 90° to the rotary axis. Also in this way, any desired imbalances can be adjusted via the one or more mass bodies by way of a repositioning of one or more mass bodies, which imbalances will effectively counteract any otherwise present imbalances.

Figure 4A:
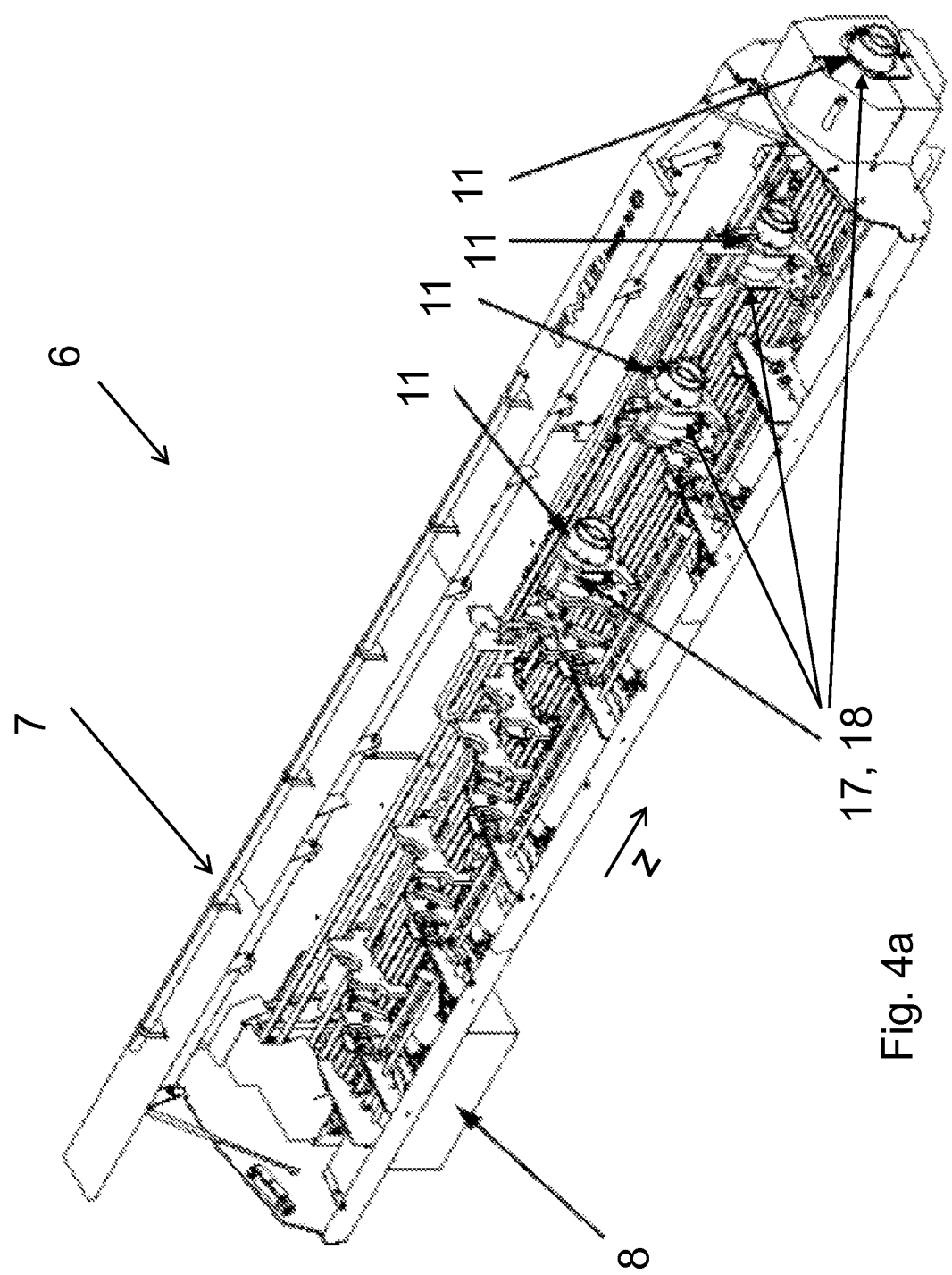
FIG. 4a shows a global schematic view of a bar loading magazine with a balancing device.

FIG. 4a shows a bar loading magazine 6, into which a material bar 1 (not shown) is to be introduced for being supported and guided on a turning machine along the z axis. Amongst other things, the bar loading magazine 6 has e.g. a housing and a hood 7 as a cover. Further, a balancing device having four guiding units 11, in relation to which respectively one, preferably several mass bodies (not shown) can be repeatedly positioned, is integrated into the bar loading magazine 6. In order to detect any positioning requirements and corresponding positioning of the mass bodies, for example sensors 17, in particular for detecting the intensity of vibrations, e.g. by detecting vibration amplitudes, as well as actuators 18 for actuating the positioning are expediently provided on all of these guiding units 11. In order to drive the actuators in response to sensor signals indicating a required repositioning, the balancing device integrated into a bar loading magazine 6 according to FIG. 4a preferably has an appropriately suitable open- or closed-loop control unit 8.

Figure 4B:
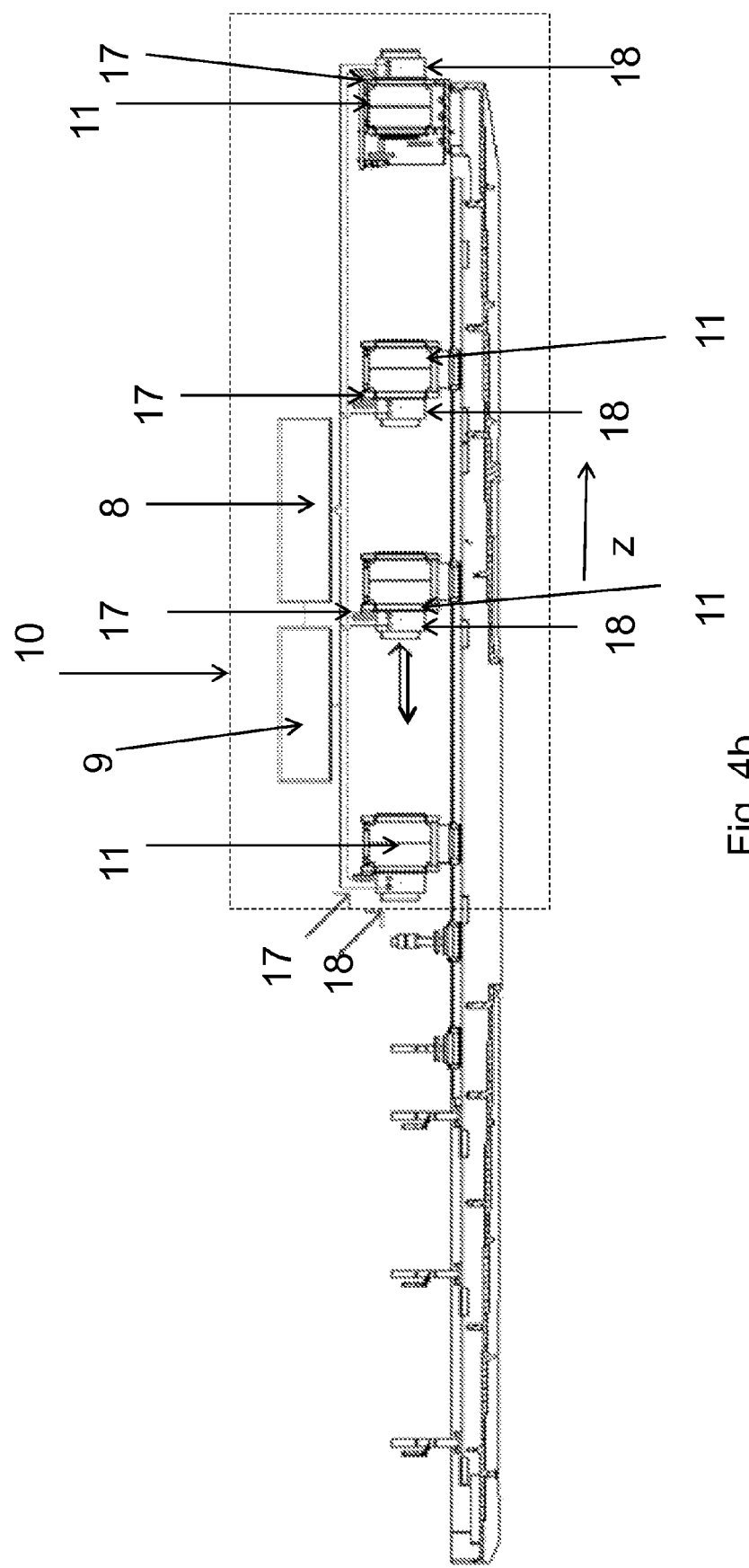
FIG. 4b shows a schematic diagram of a balancing device within a bar loading magazine.

In the diagram of FIG. 4b, which is based on FIG. 4a and schematically shows such a balancing device 10 integrated into a bar loading magazine 6 according to FIG. 4a, it can further be seen that at least one of these guiding units 11, preferably all of the guiding units 11, can be traversed in both directions along the z axis, e.g. by means of a carriage. Thus, if a material bar, which is not shown in FIGS. 4a and 4b, is supported and guided in the guiding units 11, and a machined overhang 4 (FIG. 1a) of the material bar is cut off after the machining process in the processing area of the turning machine, the material bar is subsequently moved on for further processing and the material bar consequently gets increasingly shorter during the machining process, so that such a guiding unit 11 that can be traversed along the z axis can expediently also be moved on by the controller of the turning machine and/or of the bar loading magazine along the z axis. As a result, it becomes possible that such a guiding unit may continuously be used as long as possible for guiding the material bar. As can further be seen from FIG. 4b, depending on the type of the positioning unit, for example in the case of actuators 18 that carry out a hydraulic or pneumatic positioning of the mass bodies, an actuator supply unit 9 may also be associated with the open- or closed-loop control unit 8, by means of which the positioning medium will be supplied as needed for the required positioning.

Thus, a balancing device 10 according to FIG. 4b can be used, after bringing the at least one mass body of a guiding unit 11 into a starting position and a subsequent positive and/or non-positive connection with the guiding unit 11 and/or a material bar introduced thereto, to detect any imbalance, in particular in relation to a respective guiding unit, of the introduced material bar during rotation in a simple manner by means of the sensors 17. The positive and/or non-positive connection can be carried out, depending on the specific embodiment, in particular mechanically, pneumatically and/or hydraulically. The sensor signals supplied to this end by the sensors 17 to the open- or closed-loop control unit 8 can expediently initially be checked with regard to whether they exceed a predefined limit value in relation to the imbalance and/or the vibrations caused thereby. If subsequently the open- or closed-loop control unit 8 detects a need for repositioning the mass bodies because of an imbalance, the actuators 18 will correspondingly be driven or controlled in order to counteract this imbalance or the vibrations by way of repositioning the mass bodies accordingly.

Depending on the specific embodiment, a respective mass body can here be repositioned in relation to the guiding unit 11 between a pushing-on for moving on a material bar, i.e. according to FIG. 4b by means of the guiding unit 19, and the beginning of a new rotation of the material bar and/or also during the rotation of the material bar.

According to the above description, an embodiment of a guiding unit 11 thus comprises bushes 12 inserted into sleeve-like carrier units that are rotationally supported, in which bushes a material bar 1 can be positively and/or non-positively received, with the repeatedly positionable mass bodies being provided on the carrier units. At least after each completed positioning of the mass bodies, the latter are fixedly connected in the same way positively and/or non-positively with a respective carrier unit. During rotation of the material bar, in this case the bushes and sleeve-like carrier units rotate at the same rotary speed or angular speed. The mass bodies inserted for counteracting an imbalance are here located on a circular path that is perpendicular to the rotary axis.

At the start of the machining process, the mass bodies are then initially brought into a starting position in particular in such a way that the mass bodies themselves do not generate any imbalance and/or that on the basis of specified profile data of the material bar and/or clamping data of the material bar in the bush, in particular in relation to a profile recess of the bush, a starting position for the mass bodies is specified in which the imbalances that are respectively caused by the mass bodies, the material bar, the bush and the sleeve-like carrier unit during rotation will preferably at least substantially compensate themselves in a pre-calculated manner.

Provided an initial or changed imbalance is detected during the advance movement of the material bar in the direction of the z axis and/or during rotation about the rotary axis z' specified by the guiding unit, which requires a repositioning of the mass body, then such an imbalance can be counteracted by a repositioning or a repeated repositioning of the mass bodies in relation to the guiding unit. Depending on the specific design, such a repositioning in relation to the guiding unit can be carried out for example by changing the angular position of the mass bodies relative to the rotary axis z' relative to the angular position of a material bar clamped in the guiding unit and/or by changing the radial distance from the rotary axis z. In a particularly preferred embodiment, the rearrangement of these compensation masses can in principle be done at any time during the machining process. As described above, this is expediently achieved on the basis of sensor data determined by the guiding unit and an open- or closed-loop control unit processing this data. The detection of any sensor data can here be triggered on a continuous basis or upon occurrence of a certain event, e.g. an event defined by time, location, force or in any other way, such as for example a specified speed limit value or a specified advance travel, and the presence of a certain event may be determined for example by means of position encoders or travel-time measurement, force sensors etc. Also, any sensors used for detecting respective sensor data may be designed differently according to specific requirements and may also comprise for example optically or mechanically based sensors for detecting an imbalance or any vibrations caused thereby. If the processing of the sensor data shows that a repositioning of the mass bodies is necessary, the necessary position adjustment or repositioning of the mass bodies will be carried out accordingly.

Further, a guide for positioning the mass bodies e.g. in the form of grooves and a correspondingly suitable shaping of the mass bodies may be provided within the context of the invention. The positioning itself, however, may be carried out in various ways, e.g. by means of spring-mass systems or other mechanical guiding systems, including those where a mass body itself is provided with guiding means or fastening means such as hooks, eyelets, recesses or formations.

However, the positioning may also be carried out pneumatically or hydraulically by means of a suitably adjusted pressure build-up around a mass body or, in the case of magnetic mass bodies, also by way of a suitable open-/closed-loop control of a magnetic field arranged around the guiding unit.

Thus, for a contactless displacing of the mass bodies, e.g. servo electric drives that can displace masses in a contactless manner by applying a magnetic field similar to a stepping motor or electro-pneumatic drives having a similar principle of operation as a pneumatic rotary motor may be used.

In the case of pneumatic and hydraulic drives, a desired angular position and/or a desired distance of the mass body from the rotary axis may be reached for example by way of a force control that clearly defines the angular position and/or the distance of the mass bodies. In the case of servo electric drives, the angular position and/or the distance can, like in a stepping motor, be very precisely defined. In principle, a travel measurement control similar to a rotary encoder or a glass scale is conceivable, in order to ensure an accurate angular position and/or distance of the mass bodies.

Since the mass bodies also do not have a certain length/width ratio to each other and can be freely selected within certain limits in terms of their dimensions, the invention can consequently be adapted in a versatile manner depending on the specific requirements.

The invention therefore allows the specific arrangement of the mass bodies within a bar loading magazine to be carried out as early as before the beginning of a manufacturing process, and it can be readjusted automatically during operation, in particular also as a function of the advance movement. Consequently, compared to the prior art, the invention allows an automatic readjustment or adjustment of mass bodies as compensation weights for compensating undesired imbalances during the entire manufacturing process. As a consequence, any undesired vibrations are avoided and higher rotary speeds can be ensured with consistent manufacturing quality.

Summarising, according to the invention, mass bodies or units, which can be dynamically and individually positioned, are consequently integrated for compensating the vibrations of rotating material bars within a bar loading magazine, so that the occurring centrifugal forces that are caused by the imbalance of rotating material bars, can be compensated by a corresponding arrangement of the mass bodies. The rearrangement of the masses used during this balancing process can be carried out at any time during the machining process and can in particular expediently be carried out automatically on the basis of sensor data by way of an open- or closed-loop control. If form-locked bushes of a bar loading magazine are received in rotationally supported sleeves, then the mass bodies can be fixed thereto, so that during rotation of the material bars, both bushes, sleeves and the mass bodies fixed thereto can in principle rotate at the same angular speed. The mass bodies are preferably located on a circular path that is arranged perpendicularly to the rotary axis. In their starting position or base position, the various mass bodies are expediently arranged in such a way that they behave in a vibrationally neutral manner, i.e. they themselves do not generate any imbalance. Once the rotation of the material bars has started, it may cause an undesired imbalance that will be sensed by the sensors. The open- or closed-loop control will then ensure the adjustment or repositioning of the mass bodies, so that these counteract the imbalance of the material bar by their own imbalance and preferably also compensate it. Thus, the vibrations are reduced to a desired minimum, so that a more economical machining of the material bars is made possible even at higher rotary speeds. The capacity of the balancing device according to the invention is limited only by the possible positioning area available for the mass bodies, in particular the space, as well as by the shape, the mass and/or the position of the mass bodies relative to the centre of rotation. Thus, a restriction may consist in the fact that because of the design, the mass bodies may not be displaceable by 360 degrees on such a circular path. Preferably, in the case of bushes, at least two mass bodies are arranged on a total of two circular paths in relation to each of these bushes, since as a rule any imbalance can be compensated via two complete circles, even if from an application-specific point of view, the complete imbalance of the mass bodies cannot be utilised here. The accurate positioning of the mass bodies, in particular in the case of a hydraulic or pneumatic adjustment, is subject to the limits of manufacturing inaccuracies, material friction and the centrifugal force within a rotating system. Thus, a fine adjustment of the mass bodies is possible only within certain limits.

Instead of the above-described embodiments using bushes for transferring force to a material bar, however, it is also possible to establish a positive and/or non-positive connection between the mass bodies and a guiding unit used for rotating the material bar and/or the material bar itself, so that during the rotation of an introduced material bar, one or more mass bodies rotate together with the material bar at the same angular speed about the rotary axis. This can be carried out for example by corresponding clamping means which are either preloaded or which fix the material bar as a result of a clamping force being applied. In this context, the mass bodies may be movably supported in such a way that they are axially displaced together with the material bar as a result of an advance movement. Thus, the use of bushes is not absolutely necessary. Rather, a dynamic balancing using dynamically and individually positionable mass bodies can be used within the context of the invention also in a bar loading magazine having a guiding channel that is either continuous or is made up of segments.

LIST OF REFERENCE NUMERALS

1 Material bar
2 Spindle of the turning machine
3 Clamping means
4 Overhang
5 Frame
6 Bar loading magazine
7 Hood
8 Open- or closed-loop control unit
9 Actuator supply unit
10 Balancing device
11 Guiding unit 12 Bush of a guiding unit
13a, 13b Carrier unit
14a, 14b Mass bodies
15 Reception space for bush
16, 16a, 16b Positioning area for mass bodies
17 Sensors
18 Actuators for positioning
z z axis
z' Rotary axis
Δz Offset between z axis and rotary axis
αa, αb, αa', αb' Angular positions

What is claimed is:

1. A balancing device for a bar loading magazine for guiding material bars on a turning machine, wherein a z axis is defined by the longitudinal axis of a material bar guided in said bar loading magazine, comprising
at least one guiding unit designed for receiving and introducing a material bar, along the z axis and which allows the material bar introduced and conveyed for being machined on the turning machine to be rotationally supported, and wherein said guiding unit is designed in such a way that such a rotation of the introduced material bar is carried out about a rotary axis that extends either coaxially with or offset from the z axis, and characterized by
at least one mass body that can be repeatedly positioned in relation to said guiding unit, which mass body, each time it has been positioned, is in at least one of a positive connection and a-non-positive connection with at least one of said guiding unit and the material bar, so that said mass body rotates, during rotation of an introduced material bar, together with said material bar at the same angular speed about the rotary axis, and
at least one positioning unit which is designed to bring for a first time the at least one mass body into a position in relation to said guiding unit, to detect during the rotation any repositioning that might be necessary because of an imbalance, and to reposition said mass body in each case in response to the detection of a required repositioning in relation to said guiding unit.

2. The balancing device as claimed in claim 1, wherein the positioning unit is designed to reposition the mass body in relation to the guiding unit between a pushing-on for the conveying of the introduced material bar and the beginning of a rotation of the material bar.

3. The balancing device as claimed in claim 1, wherein the positioning unit is designed to reposition the mass bodies in relation to the guiding unit during the rotation of the introduced material bar.

4. The balancing device as claimed in claim 1, further comprising sensors for detecting an imbalance, in particular for detecting different levels of vibrations caused by an imbalance.

5. The balancing device as claimed in claim 1, wherein the at least one of the positive connection and the non-positive connection with the at least one of the guiding unit and/or the material bar is carried out mechanically, pneumatically, hydraulically or any combination thereof.

6. The balancing device as claimed in claim 1, wherein the guiding unit comprises at least one bush supported for rotating about the rotary axis, into which the material bar is to be introduced along the z axis.

7. The balancing device as claimed in claim 1, wherein the guiding unit comprises a guiding channel that is either continuous or is made up of segments, through which the material bar can rotate about the rotary axis.

8. A bar loading magazine for guiding material bars on a turning machine, wherein a z axis is defined by the longitudinal axis of a material bar guided in said bar loading magazine, characterised in that at least one balancing device as claimed in claim 1 is integrated.

* * * * *